June 9, 1953 C. THUMIM Re. 23,667

RESONANT SILENCER

Original Filed Jan. 3, 1949 2 Sheets-Sheet 1

INVENTOR.
Carl Thumim
BY
Ostrolenk & Faber
attorneys

June 9, 1953 C. THUMIM Re. 23,667

RESONANT SILENCER

Original Filed Jan. 3, 1949 2 Sheets-Sheet 2

INVENTOR,
Carl Thumim
BY
Ostrolenk & Faber
Attorneys

Reissued June 9, 1953

Re. 23,667

UNITED STATES PATENT OFFICE 23,667

RESONANT SILENCER

Carl Thumim, Yeadon, Pa., assignor to I-T-E Circuit Breaker Company, Philadelphia, Pa., a corporation of Pennsylvania Original No. 2,585,600, dated February 12, 1952, Serial No. 68,831, January 3, 1949. Application for reissue February 11, 1953, Serial No. 336,465

1 Claim. (Cl. 200—91)

Matter enclosed in heavy brackets [ ] appears in the original patent but forms no part of this reissue specification; matter printed in italics indicates the additions made by reissue.

My present invention relates to alternating current circuit breaker switch gear and relays and more particularly to the armatures of magnetic devices operating on alternating current.

Among these devices are included direct trip solenoids, undervoltage devices, and relays especially when they are equipped with time delay devices for purposefully retarded operation.

In any magnetic device operating on alternating current, the flux follows the current closely, the lag depending on the characteristics of the steel. The attractive force between the stationary magnetic frame and the moving armature, however, does not change sign, is always positive and in attempting to follow the flux contour, it results in a force curve with a rippled upper boundary which may be broken up into a continuous force and an oscillating force, the latter having an approximately sinusoidal shape with a frequency twice the frequency of the circuit to which the device is attached. The shape of the wave is analogous to that of an offset alternating current wave which may be broken into a symmetrical wave and a direct current component.

At the point at which the armature is calibrated to move, the combined weight of the armature and its attached parts plus the force of the spring when used is exactly balanced by the RMS value of the magnetic force. Any change in the relationship between the two sets of forces will cause the armature to move in the direction of the larger force. Since the force curve of the magnet is sinusoidal in form, the armature tends to move in accordance with the resultant force, the characteristics of the motion depending on the combination of masses and springs involved. Even slight motion of the armature takes up slack in one direction and then in the other between itself and the attached parts, especially when the latter are connected to a time delay device, between itself and the mounting pivot and between itself and the calibrated stop.

The result is an annoying buzz and sometimes a loud clatter. A number of devices in one installation, which is not uncommon, may result in enough noise to mask other signals. This constitutes a hazard in addition to the physiological effects on the operating personnel. In addition, the chattering results in wear on parts, eventually causing change of calibration or, in the worst conditions, failure.

The primary object of my invention is the provision of apparatus for overcoming or counterbalancing the tendency of the armature to vibrate.

More specifically, I provide a tuned mechanical system consisting of a weight at the end of the spring firmly attached to the armature.

This system should be undamped and should have a resonant frequency equal to that of the impressed force, i. e., twice the circuit frequency. Being in resonance, even the slightest motion of the armature is immediately amplified into a large vibration of this system which absorbs all the energy tending to make the armature vibrate.

The foregoing and many other objects of my invention will become apparent in the following description and drawings in which.

Referring now to the figures, I have shown my novel resonant silencer attached to the armature of a circuit breaker, although it will be obvious that the resonant silencer may be attached to the armature or movable element of any alternating current device in which the problems of noise, chatter, or vibration are encountered.

Figure 1:
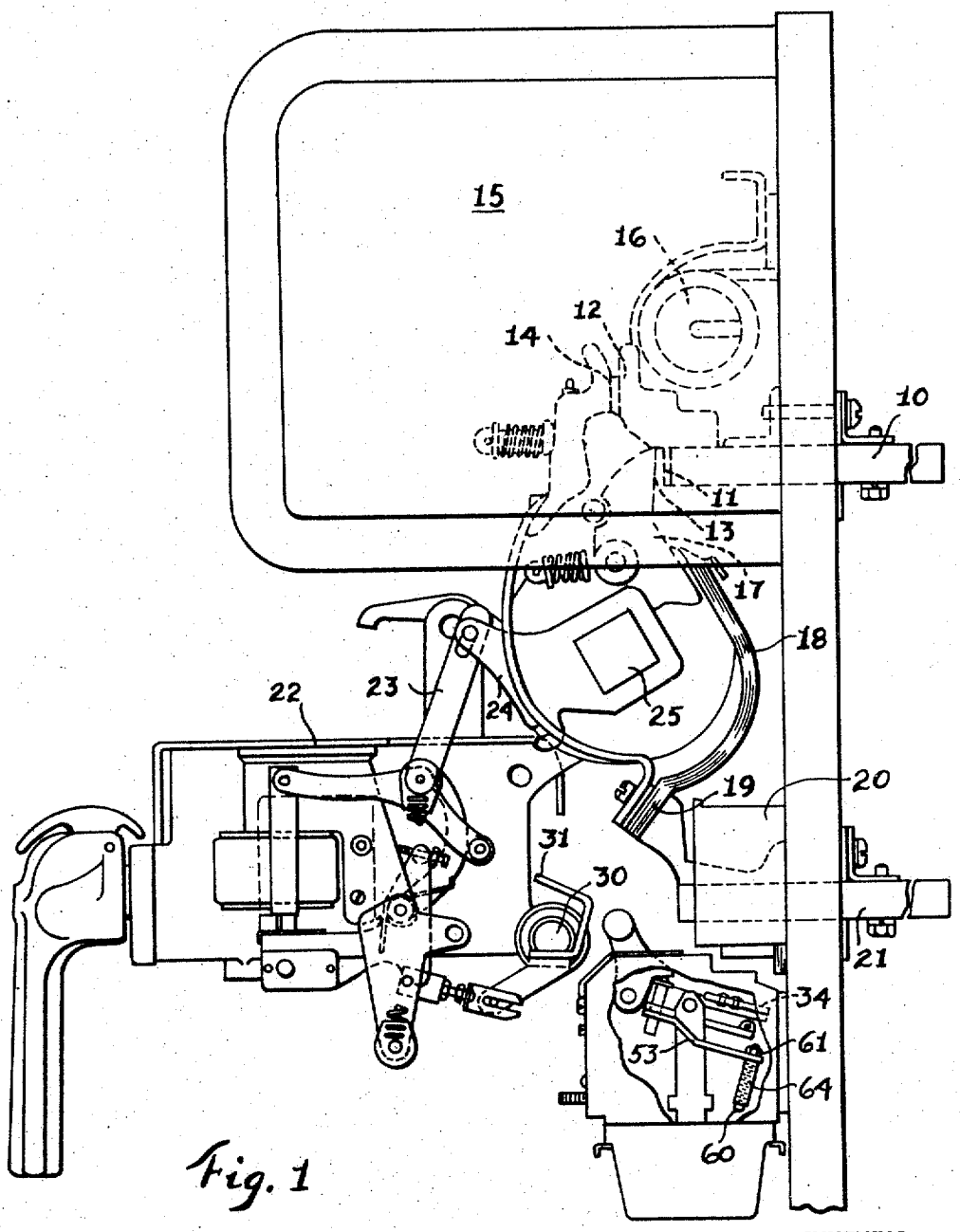
Figure 1 is a side view of a circuit breaker having a time delay tripping armature with the resonant silencer unit attached to the armature thereof.
Figure 3:
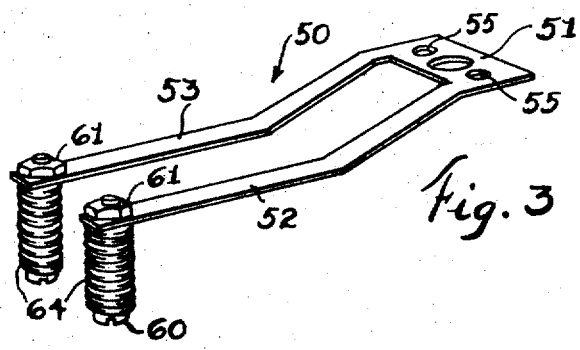
Figure 3 is a view in perspective of the resonant silencing element to be attached to the armature.
Figure 2:
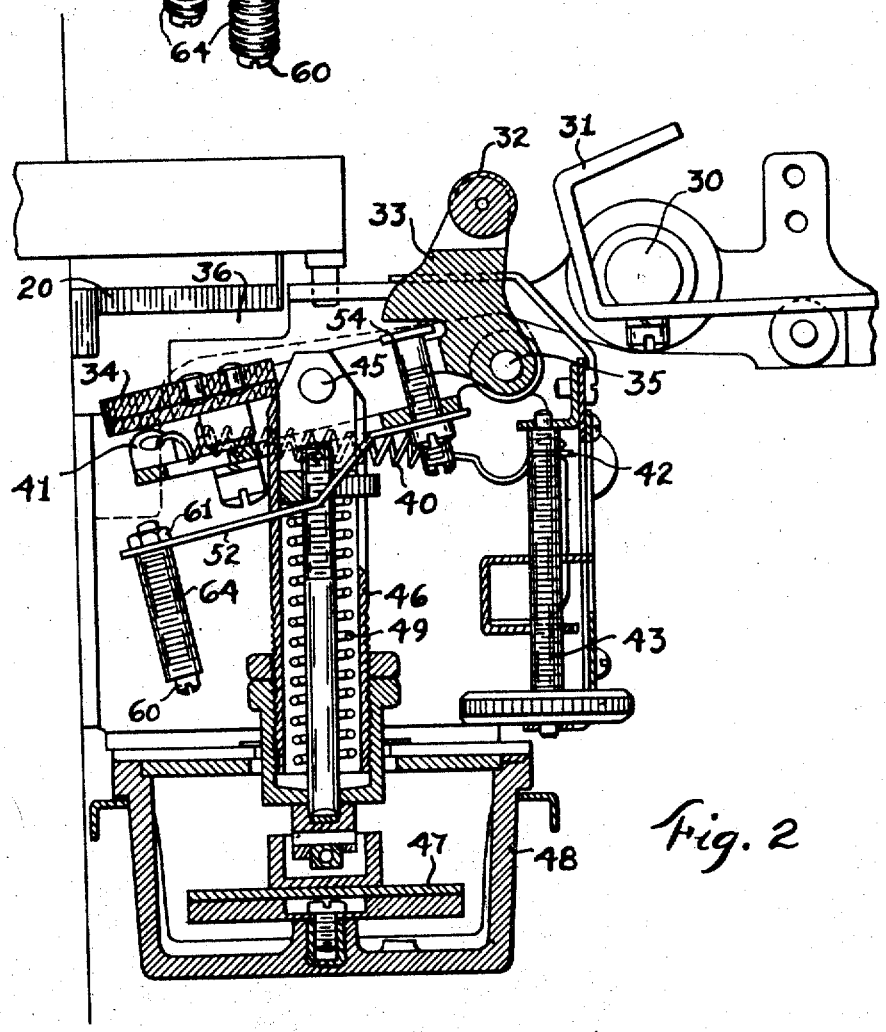
Figure 2 is an enlarged view of the armature and its resonant silencer unit.

The circuit breaker shown in Figure 1 is substantially a standard circuit breaker of well-known commercial type having an upper back connection stud 10 carrying a main stationary contact 11 and a stationary arcing contact 12 which are engaged in time by the movable main contact 13 and the movable arcing contact 14 which operate in the arc chute 15.

Blow-out coil 16 is provided in the arc chute 15, and appropriate circuit connections are made (not shown) to energize the blow-out coil during the opening of the circuit breaker.

Current passes through the movable contact arm 17 and pigtail 18 to terminal 19 of the series trip coil 20, through the series trip coil 20 to the lower back connection stud 21.

Appropriate operating mechanism 22 is provided for closing the circuit breaker, the operating mechanism being connected by link 23 to crank 24 on the shaft 25 which carries the movable contact 17.

A suitable opening bias is provided for the movable contact arm 17 tending to pull the movable contacts away from the stationary contacts, and the operating mechanism 22 is provided with suitable latch means for maintaining the elements thereof in closed circuit position against the bias of the opening spring.

The latch mechanism is so arranged that it will be tripped by rotation of the latch trip bar 30 to permit the opening bias to open the circuit breaker contacts. The latch trip bar 30 and its extension 31 are so arranged that they will be engaged by the roller 32 of the extension 33 of armature 34 which is pivotally mounted on pin 35 when the armature 34 is attracted toward the trip coil 20 and its magnet 36 on appropriate energization of coil 20.

The armature 34 is of a standard type wherein the main portion thereof is of magnetizable material so that it may be attracted by the magnetic flux generated by trip coil 20 and the magnetic material 36 of the tripping unit.

The armature is restrained and calibrated for movement only on the occurrence of an overcurrent condition of predetermined minimum value (and, therefore, on the occurrence of a magnetic flux of predetermined minimum value) by the tension spring 40 connected between lug 41 on the armature and nut 42 on the rotatably mounted calibrating screw 43.

The armature 34 is also connected by pin 45 to sleeve 46 which in turn is connected to the upper sucker disc 47 in the time delay dashpot 48.

The sleeve 46 may also have a quick trip compression spring 49 in accordance with the disclosure contained in Patent No. 2,486,594, issued November 1, 1949, assigned to the assignee of the present invention.

As above pointed out, particularly in those instances where the movement of the armature is time delayed as the current value at which the armature is calibrated to move to trip position is approached (but not reached) the sixty cycle alternating current generating a similar variation in magnetic flux tends to cause the armature 34 to vibrate at a frequency of one hundred and twenty cycles per second producing a chatter and noise combined with a low pitch hum.

My invention contemplates providing a resonant inertia member and attaching the same to the armature, the said resonant inertia member being tuned to have a period of vibration identical with that of the armature and the securement of the inertia member being so arranged that its vibration will always be in opposite phase to that of the armature whereby the movement of the armature in one direction will be counterbalanced by the movement or vibration of the resonant inertia member in the opposite direction.

For this purpose I provide the double pronged leaf spring member 50 having the securing section 51 and the legs 52, 53. Section 51 is secured to the armature in any suitable manner as, for instance, by bolts 54 passing through appropriate openings 55, 55.

The outer ends of the legs 52, 53 carry secured thereto in any suitable manner as, for instance, by the bolts 60 and nuts 61 passing through appropriate openings in the ends of legs 52 and 53 a plurality of weights 64 in this case in the form of washers which may be carried on the bolts 60.

The weights 64 are divided into individual small segments so that adjustments may readily be made by adding or removing weights until the mass of the weights 64 is adjusted so that the spring members 52, 53 are tuned to have a period of vibration of one hundred and twenty cycles per second or exactly equal to the period of vibration of the armature 34 when subjected to a high current condition short of the over-current condition for which the unit is to operate.

In another embodiment, the structure consists of a fixed mass fastened to a spring which is adjustable as to length from the mass to the fixed point. The principle to be maintained is that the combination of mass and spring must have a natural frequency which is the same as that of the disturbing force and, therefore, is in resonance with it.

With the period of vibration of the spring 50 tuned to be resonant with the period of vibration of the armature 34 induced therein by the variations in magnetic flux owing to the variations in current, then the positioning of the spring member 50 and of the weights 64 is such that the vibration of the spring 50 will always be in opposite phase to the vibration of the armature 34, thereby damping or cancelling out the vibration of the armature 34—or rather the vibration of the two elements in opposite phase cancel each other out to produce no net vibration at all.

The reason for this is that as armature 34 is drawn upwardly at or near the positive peak of a sixty cycle sign wave, the initial inertia of the mass 64 causes it to remain stationary in space and, therefore, to move in an opposite direction with respect to the movement of the armature 34.

When the armature 34 falls back when the alternating current sign wave passes through zero, the spring 50 and its mass 64 being tuned to have the same period of vibration as the armature will now again have reversed its motion with respect to the armature 34 and will be moving toward the armature 34.

When once more the armature is pulled up again as the alternating current sign wave approaches its maximum negative value, the natural period of vibration of the spring 50 and weights 64 and the inertia of these members will now cause these members to be once more stationary in space but, therefore, in condition where they are moving away from the armature 34.

Thus, the vibration of the armature 34 results in an equal and opposite vibration of the spring 50 and its weights 64. This is so because the initial vibration of the armature 34 tends to start the spring 50 and its elements in vibration in opposite phase; and since the spring and its weights 64 are tuned to vibrate at the same frequency as the armature 34, this opposite relationship will always be maintained.

The natural condition for these units is an opposite phase relationship since each vibration of the armature 34 tends to move the armature 34 away from the weights or masses 64 so that each of these elements tends to be out of phase with the other and since they are in tune this out of phase relationship will be maintained.

The actual result, however, is that with two masses thus opposing each other at the same frequency they cancel each other out to produce a noiseless vibrationless system. The only time a noise or sound will be encountered is when there is a violent change in the current and, therefore, the flux which attracts the armature.

The system will vibrate, hum or make a noise momentarily until the new condition levels off with the resonant spring or inertia unit damping out the vibrations of the armature and vice versa.

Thus, where a circuit breaker is set to trip at three times normal, then as long as the current stays at or near normal no vibration will be heard. This has been found by actual experiment to be the case.

Should the current suddenly change to twice normal, a momentary hum will ensue owing to the violent change in the amplitude of induced vibration, but this will be damped out almost immediately by the two forces which oppose each other, to wit, the armature and the spring.

Should the current suddenly change to three times normal or more, then the first violent reaction which pulls the armature up will, owing to the setting of the calibrating screw, permit the armature to trip the circuit breaker. If the armature does not trip the circuit breaker at this first violent reaction to a change in the current value, then the spring which is brought into movement of equal and opposite force in resonance with the armature quickly damps out the vibrations of the armature at this changed force.

Accordingly, the circuit breaker may be adjusted for any tripping value and if it is adjusted to trip at ten times normal, then the armature vibrations are damped out at any value up to ten times normal, while when the ten times normal condition is reached the entire system is pulled up sufficiently to trip the elements.

Thus, my invention has particular applicability to time delayed and calibrated systems where an armature may hang on or float when the current value approaches the trip point without quite reaching it, producing the unpleasant noise and vibration.

My novel system by damping out this noise or vibration at any value below the tripping point and permitting a trip to occur at the tripping point ensures positive and accurate operation of the armature, and cuts out the noise and the wear incident therewith.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claim.

I claim:

In a circuit breaker for use in a circuit carrying cyclically pulsating current having a pair of cooperable contacts, a trip magnet responsive to predetermined currents for effecting disengagement of said contacts, said magnet having an armature, said armature having [movement] *vibration* in response to less than said predetermined currents, a calibrated biasing means for restraining said armature for movement to full trip position only in response to energization of said magnet by said predetermined current and a resonant inertia member attached to said armature and having the same period of vibration as said [cyclically pulsating current] *armature,* said inertia member comprising a double pronged leaf spring secured to said armature at one end and having legs at the other end and a plurality of weights secured to said legs, the connection of said inertia member to said armature being such that said inertia member vibrates out of phase with said armature, and restrains movement of said armature at currents less than said predetermined currents.

CARL THUMIM.

References Cited in the file of this patent or the original patent

UNITED STATES PATENTS

| Number | Name | Date |
|---|---|---|
| 667,106 | Thomson et al. | Jan. 29, 1901 |
| 819,559 | La Cos | May 1, 1906 |
| 1,014,257 | Rosenqvist | Jan. 9, 1912 |
| 1,425,700 | Scott | Aug. 15, 1922 |
| 1,798,922 | Ytterberg | Mar. 31, 1931 |
| 2,265,297 | Little | Dec. 9, 1941 |
| 2,340,973 | May et al. | Feb. 8, 1944 |
| 2,419,892 | Graves, Jr. | Apr. 29, 1947 |
| 2,439,165 | Graves, Jr. | Apr. 6, 1948 |